Figures 1, 2:
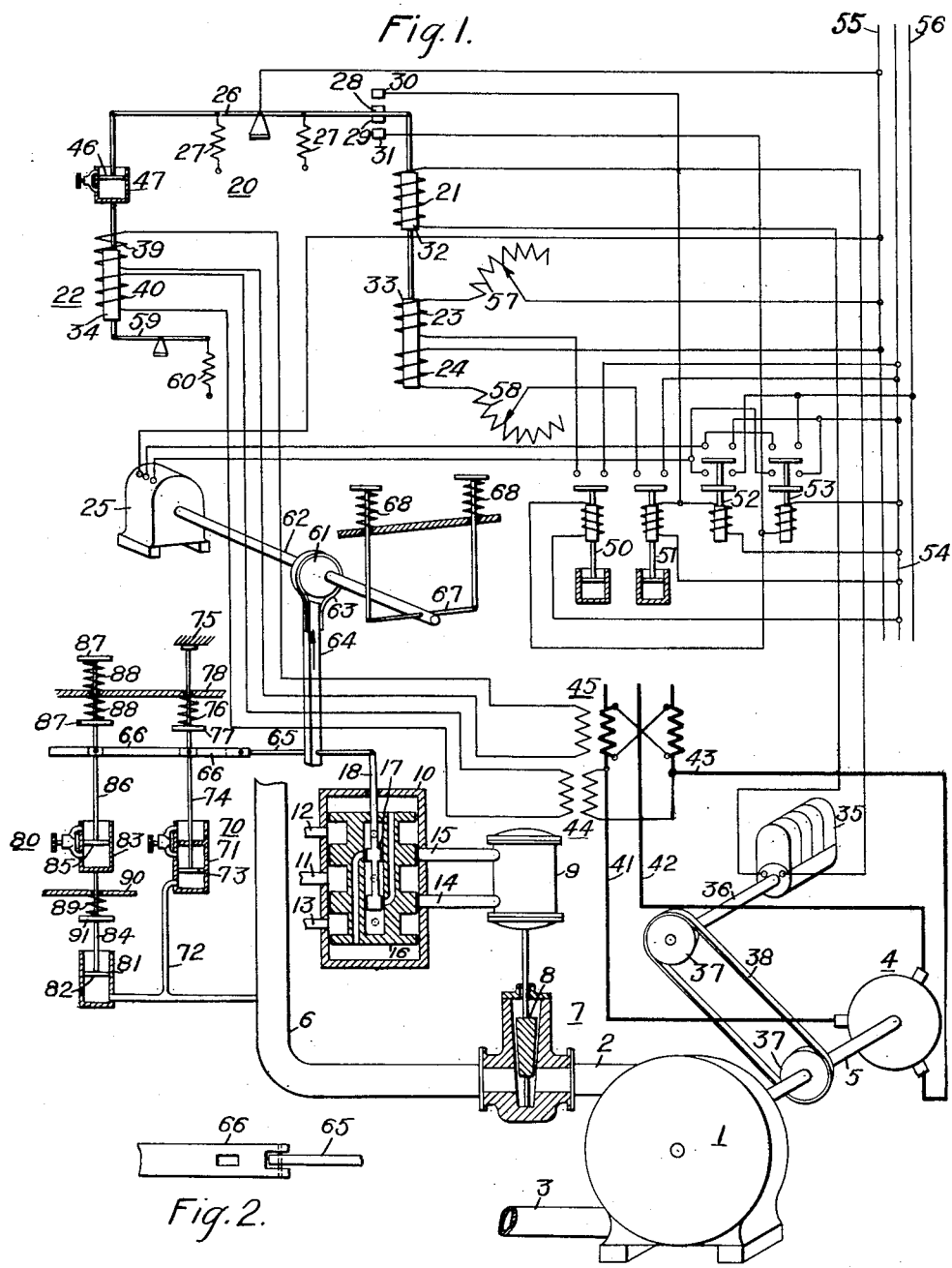

June 10, 1924.

S. A. STAEGE 1,497,412

SPEED REGULATOR SYSTEM

Filed July 5, 1919

WITNESSES:
J. A. Helsel
W. B. Wells

INVENTOR
Stephen A. Staege.
BY
Wesley G. Carr
ATTORNEY

Patented June 10, 1924.

1,497,412

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed July 5, 1919. Serial No. 308,711.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems and particularly to regulator systems for governing the speed of water wheels.

One object of my invention is to provide a water wheel with a regulator that shall maintain the speed of the wheel substantially constant in a simple and an efficient manner while so limiting the operation of the regulator in accordance with the fluid pressure in the penstock connected to the wheel as to guard against injury to the penstock by reason of an abnormally low pressure in it.

Another object of my invention is to provide a water wheel with a valve mechanism that shall be operated in accordance with the speed of, and the load upon, the water wheel and in accordance with the fluid pressure in the penstock connected to the water wheel in order to maintain the speed of the water wheel substantially constant without causing injury to the penstock.

In operating a water wheel, and especially when the water wheel is connected to an electric generator, it is very desirable to maintain the wheel at a substantially constant speed, irrespective of the load upon it or of the rapidity of the changes in load that may be effected. Moreover, it is desirable, in operating water wheels, to guard against taking water from the penstock at a too-rapid rate, such as would lower the pressure within the penstock below atmospheric pressure and, consequently, in many cases, cause the crushing in of the walls of the penstock.

In a regulator system constructed in accordance with my invention, a water wheel is provided with a valve which is operated in accordance with the speed of, and the load upon, the wheel and in accordance with the fluid pressure within the penstock that is connected to the water wheel. Moreover, the valve is limited, in its operation, in case the fluid pressure within the penstock falls below a predetermined value.

In the system shown for practicing my invention, a water wheel is directly connected to an alternating-current generator and, a main hydraulically-operated valve, which is controlled by a pilot valve, is provided for admitting water from the penstock to the water wheel.

A regulator, comprising a main winding, an auxiliary winding, and two anti-hunting windings, is provided for governing the operation of a motor which adjusts the position of a pilot valve in a manner to maintain the speed of the water wheel substantially constant. The main winding is connected to a magneto generator which is operated in accordance with the speed of the water wheel and serves to operate the regulator and, accordingly, the pilot valve, in accordance with the speed of the water wheel.

The auxiliary winding of the regulator is energized in accordance with the load upon the electric generator and is connected to the regulator proper by a loose connection in order to effect the operation of the regulator only in case of sudden changes in load upon the generator. The auxiliary winding anticipates the action of the main winding in case of a sudden change in the generator load and changes the amount of water supplied to the wheel even before any change in its speed has been effected.

The two anti-hunting windings are selectively energized at a predetermined time after the operation of the regulator to change its setting and return the regulator to normal position just previous to the operating of the water wheel at normal speed and thus prevent the so-called hunting action or overtravel of the various moving parts.

The pilot valve is directly controlled, in accordance with the fluid pressure in the penstock, to compensate for any changes in pressure in the penstock that may be caused by a sudden operation of the main valve. Moreover, means is provided for directly operating the pilot valve to close the main valve in case the pressure within the penstock is reduced below atmospheric pressure by reason of too rapid opening of the main valve.

Summarized, the present system comprises a regulator which is principally speed controlled, but is provided with means for temporarily actuating said regulator in case of sudden load changes. The system is also provided with means for temporarily compensating for changes in water-wheel pressure, as well as for dangerous changes in pressure, and an anti-hunting device.

In the accompanying drawing, Fig. 1 is a diagrammatic view of a regulator system constructed in accordance with my invention, and Fig. 2 is a detail view of the mechanism serving to operate the pilot valve shown in Fig. 1.

Referring to the drawing, a water wheel 1, having an inlet 2 and an outlet 3, is directly connected to a generator 4 in any suitable manner, as by means of a shaft 5. The inlet 2 of the water wheel 1 is connected to a penstock 6 by means of a main, hydraulically-operated valve 7.

The valve 7 is provided with a gate 8, which is operated in any suitable manner by means of a cylinder 9, which is supplied with hydraulic pressure from an auxiliary valve 10. The auxiliary valve 10 is provided with a supply opening 11, two exhaust openings 12 and 13 and two openings 14 and 15 which are directly connected to opposite sides of a piston (not shown) within the operating cylinder 9. The auxiliary valve 10 is further provided with a piston 16 which contains a pilot valve 17. The pilot valve 17 is provided with an operating rod 18 which is raised and lowered, in a manner to be hereinafter set forth, to govern the operation of the auxiliary valve 10 and, accordingly, the operation of the main valve to vary the amount of water supplied from the penstock 6 to the water wheel 1.

It is deemed unnecessary to completely describe the construction and the operation of the pilot valve 17 and the auxiliary valve 10, inasmuch as they are common and usual forms of valves and are not essential to the operation of my invention. It may be noted, however, that lowering of the pilot valve 17 permits fluid pressure to flow in through the opening 11 to the upper part of the auxiliary valve 10 for forcing the piston 16 downwardly. Such movement of the valve 10 admits fluid pressure through the opening 14 below the piston within the cylinder 9 and exhausts the fluid contained above the piston through the opening 15. Consequently, the valve 7 is opened to increase the amount of water supplied to the water wheel 1 from the penstock 6.

In case the pilot valve is raised, fluid pressure is admitted to the lower part of the auxiliary valve 10 to raise the piston 16. Upon raising of the piston 16, fluid pressure is admitted to the upper part of the cylinder 9, so as to effect a closing of the valve 7 and, consequently, to reduce the amount of water which is supplied to the water wheel 1. Thus, it is apparent that, upon lowering of the pilot valve, the amount of water supplied to the water wheel is increased in order to increase the speed of the wheel and, upon raising of the pilot valve, the amount of water supplied to the wheel is reduced to decrease the speed of the wheel.

A regulator 20, comprising a main electromagnet 21, an auxiliary electromagnet 22 and two anti-hunting windings 23 and 24, is provided for governing the operation of a motor 25 which controls the operation of the pilot valve 17. The regulator 20 is further provided with a pivotally-mounted contact arm 26, which is maintained in a normal position by means of two springs 27, and two main contact members 28 and 29 which are adapted to respectively engage two stationary contact members 30 and 31, according to the operative position of the contact arm. The electromagnet 21 is provided with a core armature 32, and the windings 23 and 24 are provided with a core armature 33. The core armatures 32 and 33 are pivotally connected to one end of the contact arm 26, and the electromagnet 22 is provided with a core armature 34 which is connected, through a loose connection, to the other end of the contact arm 26.

A magneto generator 35 of a suitable design is operated in any convenient manner in accordance with the speed of the water wheel 1 and is directly connected to the winding of the electromagnet 21 in order to operate the contact arm 26 in accordance with the speed of the wheel 1. Although the magneto generator 35 is shown connected to the water wheel 1 by means of a shaft 36, two pulleys 37 and a flexible connection 38, it is to be understood that any other suitable connecting means between the generator and the water wheel may be utilized.

The electromagnet 22 is provided with two windings 39 and 40, which are energized in accordance with the load upon three supply conductors 41, 42 and 43 that are connected to the main generator 4. The winding 40, which is a potential winding, is connected across the supply conductors 41 and 43 by means of a transformer 44 and the winding 39, which is a current-winding, is connected to the two supply conductors 41 and 43 by means of a current transformer 45.

The loose connection, which is interposed between the core armature 34 of the electromagnet 22 and the contact arm 26, embodies a piston 46, which is pivotally connected to the contact arm and a dash pot 47, within which the piston 46 operates and which is directly connected to the core armature 34. A by-pass, having an adjusting screw, is provided for connecting the upper and the lower portion of the dash pot 47 in order to adjust the stiffness or rigidity of the connection between the core armature and the contact arm. Thus, it is apparent that a sudden movement of the core armature 34 will be immediately transmitted to the contact arm 26, whereas a slow steady movement of the core armature 34 will be dissipated by the loose connection and will not be transmitted to the contact arm. Accordingly, the electromagnet 22 is operated by a sudden change in load upon the generator 4 to operate the contact arm 26 and, consequently, to control the regulator 20 but, in case of a slow steady change in load upon the generator 4, the electromagnet 22 will have practically no effect upon the regulator 20.

The core armature 34 of the electromagnet 22 is counter-balanced by a pivotally-mounted lever 59 and a spring 60 which is connected to one end of the lever 59. During operation of the regulator, the core armature 34 will assume different positions within the windings 39 and 40, according to the load upon the generator 4, but the position of the core armature 34 within the windings has no effect upon the operation of the regulator, inasmuch as the regulator is only operated by the electromagnet 22 in accordance with the rapidity of the change in load upon the generator 4.

The main contact terminals 28 and 30, and 29 and 31 serve to govern the operation of two relays 50 and 51 and two switches 52 and 53. The relays 50 and 51 control the energization of the anti-hunting coils 23 and 24, and the two switches 52 and 53 control the operation of the motor 25. Upon engagement of the main contact members 28 and 30, the switch 52 and the relay 51 are operated by a circuit which extends from an auxiliary supply conductor 54, in parallel, through the energizing windings of the switch and the relay and the contact members 30 and 28, to an auxiliary supply conductor 55. Upon engagement of the main contact terminals 29 and 31, the switch 53 and the relay 50 are energized by a circuit which extends from the auxiliary supply conductor 54 to the auxiliary supply conductor 55.

Upon operation of the relay 50, the anti-hunting winding 23 is connected, in series with an adjustable resistor 57, across the supply conductors 55 and 54, and, upon operation of the relay 51, the anti-hunting winding 24 is connected, in series with an adjustable resistor 58, across the supply conductors 55 and 54. The anti-hunting windings 23 and 24 have been illustrated as associated with the core armature 33 but, if so desired, these windings may be associated with the core 32 of the electromagnet 21.

The two anti-hunting windings 23 and 24 serve to oppose the initial operation of the contact arm 26 in order to return the regulator 20 to a normal position just previous to the obtaining of normal speed by the water wheel 1. Thus, in case the contact arm 26 is moved to engage the main contact members 28 and 30, the relay 51 will be operated to energize the winding 24 and change the setting of the regulator so that the arm 26 may be returned to normal position sooner than would be effected if the anti-hunting coil 24 were not energized. In a similar manner, the relay 50 closes the circuit of the anti-hunting winding 23 to effect disengagement of the contact members 29 and 31. The relays 50 and 51 are provided with dash pots, and the windings 23 and 24 are provided with adjustable resistors 57 and 58 in order to adjust the time and the strength of operation of the anti-hunting windings.

The switch 52, which is operated upon engagement of the contact members 28 and 30, serves to connect the motor 25 across the supply conductors 54, 55 and 56, in order to rotate it in a clockwise direction, and, the switch 53, which is operated upon engagement of the contact terminals 29 and 31, serves to connect the motor 25 across the supply conductors 54, 55 and 56 for rotating it in a counter-clockwise direction.

The motor 25 is provided with an eccentric member 61 mounted upon its shaft 62 for operating the pilot valve 17 in accordance with the operation of the regulator 20. The eccentric member 61 is connected to the valve stem 18 by means of a strap 63, a rod 64 and a lever 65. The lever 65 is pivotally connected, near one end, to the valve stem 18 and is pivotally connected, near the other end thereof, to the bifurcated end portion of a lever 66, the lever 66, under certain operating conditions, serving as a fulcrum for permitting the operation of the pilot valve 17 by means of the motor 25. The motor 25 is biased to a normal position in any suitable manner, as by means of a rod 67 which is connected to the shaft 62, and is provided wth spring members 68 for opposing the rotation of the motor either in a forward or in a reverse direction.

It will be noted from the above description that the rotation of the motor 25, in a clockwise direction, raises the pilot valve 17 to close the main valve 7 and that the rotation of the motor 25, in a counter-clockwise direction, effects a lowering of the pilot valve 17 to open the main valve 7.

A safety device 70 is operated by the fluid pressure within the penstock 6 for controlling the pilot valve 17 and, accordingly, the main valve 7 to prevent reducing the pressure within the penstock to such point as would endanger crushing in of the penstock walls.

The safety device 70 essentially embodies a cylinder 71, the lower end of which is directly connected to the penstock 6 by means of tubing 72, and a piston 73 which operates within the cylinder 71. The cylinder 71 is provided with an adjustable by-pass in order to adjust the speed of operation of the piston 73. The piston 73 is connected to a rod 74 which is pivotally connected to the lever 66 and normally engages a stationary member 75. A spring member 76 surrounds the rod 74 and is compressed between a collar 77 on the rod and a stationary support 78 to oppose the pressure of the fluid from the penstock 6 upon the bottom of the piston 73.

Under normal operating conditions, the spring 76 counter-balances the pressure upon the piston 73 but, in case of a sudden reduction in pressure in the penstock, the spring 76 will force the piston 73 and the lever 66 downwardly so as to raise the pilot valve 17 by means of the lever 65 which, at this time, will be fulcrumed upon the rod 64.

A pressure device 80, which is operated in accordance with the changes in pressure in the penstock 6, is provided in order to compensate for any change in pressure that may be effected by reason of sudden operation of the main valve 7. The pressure device 80 embodies a cylinder 81, which is directly connected to the penstock 6, and a piston 82, which is directly connected to a second cylinder 83 by means of a rod 84. The cylinder 83 is provided with a piston 85 which, in turn, is provided with a rod 86 that is pivotally connected to the lever 66.

An extension of the piston rod 86 is provided with two collars 87, which are disposed upon opposite sides of the stationary support 78, and springs 88 are disposed between the collars 87 and the support 78 so as to bias the piston 85, the piston rod 86 and the lever 66 to a normal position.

The cylinder 83 is provided with an adjustable by-pass similar to the adjustable by-pass provided for the cylinder 47 and serves to adjust the stiffness of the loose connection embodying the cylinder 83 and the piston 85. A spring 89, which surrounds the rod 84 and is disposed between a stationary support 90 and a collar 91 on the rod 84, serves to oppose the fluid pressure acting upon the piston 82.

Upon change of pressure in the penstock 6, the piston 82 is operated within the cylinder 81 to, in turn, effect operation of the piston 85. The piston 85 and the piston rod 86, being pivotally connected to the lever 66, operate the lever 66, with the rod 74 serving as a fulcrum. The lever 66, in turn, operates the lever 65, which is fulcrumed upon the rod 64, to raise or lower the pilot valve 17, according to whether it is desired to close or to open the main valve 7. Thus, in case of a reduction of pressure in the penstock 6, the pilot valve 17 is lowered to open the main valve 7 and, consequently, to prevent any reduction in speed of the water wheel 1 by reason of the reduction in pressure of the water supplied to it and, upon an increase of pressure within the penstock 6, the pilot valve 17 is raised to close the main valve 7 and thus prevent change in speed of the water wheel 1, by reason of the increased pressure within the penstock 6.

The cylinder 83 and the piston 85 of the pressure device 80 serve as a loose connection in order to prevent operating the pilot valve 17 by the pressure device 80 except in case of sudden changes in pressure within the penstock 6.

In case the speed of the water wheel 1 falls below normal value, the voltage of the magneto generator 35 is reduced and, consequently, the energization of the electromagnet 21 is reduced. Upon weakening of the electromagnet 21, the contact arm 26 is operated to effect engagement between the main contact members 29 and 31 and, consequently, to operate the switch 53 and the relay 50. The operation of the switch 53 connects the motor 25 across the supply conductors 54, 55 and 56 for rotation in a counter-clockwise direction and, consequently, effects a lowering of the pilot valve 17 by means of the eccentric member 61 and the parts connected to it. The lowering of the pilot valve 17 effects an opening of the main valve 7 to increase the speed of the water wheel 1.

Before the speed of the water wheel 1 has been raised to normal value, the relay 50 is operated to effect energization of the antihunting winding 23. The winding 23 changes the setting of the regulator 20 and separates the main contact members 29 and 31 just previous to the obtaining of normal speed by the water wheel 1. The operation of the winding 23 is timed to prevent overtravel by the various moving parts or the so-called hunting action. The separating of the contact members 29 and 31 stops further operation of the motor 25 and, accordingly, prevents further opening of the main valve 7. In case the contact members 29 and 31 are separated by the electromagnet 21, when the water wheel 1 has been raised to normal speed, the inertia of the various moving parts causes overtravel and, accordingly, the speed of the water wheel 1 is over-compensated.

In case the water wheel 1 is operating above normal speed, the magneto generator 35 operates the electromagnet 21 to effect engagement between the main contact members 28 and 30. Upon engagement of the main contact members 28 and 30, the switch 52 is operated to effect rotation of the motor 25 in a clockwise direction, and the relay 51 is operated, after a predetermined time, to effect energization of the anti-hunting winding 24. Upon operation of the motor 25 in a clockwise direction, the pilot valve 17 is raised to effect a closing of the main valve 7 and, accordingly, reduces the speed of the water wheel 1. Just previous to the obtaining of normal speed by the water wheel 1, the anti-hunting winding 24 effects disengagement of the contact members 28 and 30 to prevent further movement of the main valve 7.

In case of a sudden change in load upon the main generator 4, the electromagnet 22 is operated to anticipate the operation of the electromagnet 21, which would be caused by the change of speed by the water wheel 1 that must necessarily result from an increased load upon the generator 4 unless the main valve 7 is operated in accordance with the change in load upon the generator 4. Assuming a sudden increase in load, the core armature 34 and the loose connection embodying the parts 46 and 47 operate the contact arm 26 to effect engagement of the contact members 29 and 31. Upon engagement of the contact members 29 and 31, the motor 25 is operated in a counter-clockwise direction to lower the pilot valve 17 and, consequently, to open the main valve 7 so as to compensate the water wheel 1 for the increased load. The anti-hunting coil 23 is operated in the manner heretofore set forth, to separate the contact members 29 and 31 and prevent over-compensation of the water wheel 1.

Upon a sudden reduction in load upon the generator 4, the electromagnet 22 is operated to effect engagement between the main contact terminals 28 and 30 and thus anticipate the increase in speed of the water wheel 1 that would be caused by the sudden reduction in load upon it. The engagement between the contact terminals 28 and 30 effects rotation of the motor 25, in a clockwise direction, to raise the pilot valve 17 and, consequently, to effect a closing of the main valve 7 so as to prevent any increase in speed by the water wheel 1. The anti-hunting winding 24 separates the main contact members 28 and 30 to prevent further operation of the main valve 7 and, accordingly, to prevent so-called hunting action or overtravel on the part of the regulator.

The loose connection embodying the piston 46 and the cylinder 47 prevents operation of the regulator 20, by means of the electromagnet 22, except in case of very sudden changes in load on the main generator 4. In case of a gradual change in load on the generator 4, the compensation for any such change can be taken care of very easily by means of the electromagnet 21.

Assuming the valve 7 to be opening and the pressure within the penstock 6 to be suddenly reduced, the spring 89, operating on the piston rod 84 and the piston 82, lowers one end of the lever 66. The lever 66, being fulcrumed on the rod 74, rocks the lever 65 upon the rod 64 to lower the pilot valve 17. Upon lowering of the pilot valve, the main valve is raised to compensate for reduction in pressure in the penstock and, accordingly, to compensate the water wheel 1 for any reduction in speed that may have been caused by the reduction in pressure of the water which is supplied to it.

In case the pressure within the penstock 6 is suddenly increased, by reason of a sudden closing of the main valve 7, the pressure device 80 is operated to raise one end of the lever 66 and, consequently, to so rock the lever 65 as to raise the pilot valve 17. Upon raising of the pilot valve 17, the main valve 7 is closed an amount sufficient to compensate for the increase in pressure of the water which is supplied to the water wheel.

The pressure device 80 is provided with a loose connection embodying the cylinder 83 and the piston 85 in order to prevent the pressure device 80 operating the pilot valve 17 except in case of sudden changes in pressure of the water in the penstock. In all cases of gradual change in pressure within the penstock 6, sufficient compensation of the water-wheel speed for any such cause is effected by means of the electromagnet 21.

The safety device 70 is provided for operation only in case of an abnormal reduction of pressure within the penstock 6 and such as would be liable to cause crushing in of the walls of the penstock. Assuming the valve 7 to be opening at such rate as to reduce the pressure within the penstock 6 below atmospheric pressure, the spring 76 overcomes the fluid-pressure action on the piston 73 and lowers the lever 66 which is fulcrumed upon the rod 86. Upon lowering one end of the lever 66, the lever 65 is rocked on the rod 64, as a fulcrum, to effect a raising of the pilot valve 17. The raising of the pilot valve 17 closes the main valve 7 in order to prevent further reduction of pressure within the penstock 6.

From the above description, it will be noted that the water wheel 1 is compensated for changes in speed by means of the electromagnet 21, is compensated for changes in load by means of the electromagnet 22 and is compensated for changes in pressure of the fluid which is supplied to it by means of the pressure device 80. Moreover, a safety device is provided for preventing a reduction of pressure within the penstock below atmospheric pressure which, in many cases, would cause crushing in of the walls of the penstock.

Modifications in the system and arrangement and location of parts may be made within the spirit and scope of my invention and such modifications are intended to be covered by the appended claims.

I claim as my invention:

1. In a regulator system, a water wheel, a generator operated by the water wheel, a regulator operated in accordance with the speed of the wheel and in accordance with the load on said generator, means controlled by said regulator for maintaining the speed of the wheel substantially constant, and electroresponsive means for preventing hunting action in said system.

2. In a regulator system, a motor, a generator operated by said motor, a regulator operated in accordance with motor conditions and in accordance with certain changes only in generator conditions, and means controlled by the regulator for maintaining the speed of the motor substantially constant.

3. In a regulator system, a water wheel, a generator operated by the water wheel, a regulator operated in accordance with water wheel and generator conditions, means controlled by said regulator for varying the amount of water supplied to the wheel to maintain its speed substantially constant, and electroresponsive means for preventing hunting action.

4. In a regulator system, a motor, a generator operated by said motor, a regulator operated in accordance with motor and generator conditions, means controlled by said regulator for maintaining the speed of the motor substantially constant, and electroresponsive means for preventing hunting action by the regulator.

5. In a regulator system, a motor, a generator operated by said motor, a regulator operated in accordance with the speed of the motor and the load on the generator, and electroresponsive means controlled by said regulator for preventing hunting action by it and for maintaining the speed of the motor substantially constant.

6. In a regulator system, a motor, a generator operated by said motor, a regulator for maintaining the speed of the motor substantially constant, and means effective only upon a sudden change in the generator load for controlling the operation of said regulator.

7. In a regulator system, a water wheel, a generator operated by said wheel, a regulator for varying the amount of water supplied to the wheel to maintain the speed substantially constant, and means, effective only upon sudden changes in the generator load, for controlling the operation of said regulator.

8. In a regulator system, the combination with a water wheel, a generator operated by said water wheel, and an auxiliary dynamo-electric machine operated in accordance with the speed of said water wheel, of a regulator comprising a winding energized in accordance with the load on said generator, a second winding controlled by said auxiliary dynamo-electric machine, means controlled by said regulator for varying the amount of water supplied to the wheel to maintain its speed substantially constant, and electroresponsive means for preventing hunting action.

9. In a regulator system, the combination with a motor, and a generator operated by the motor, of a regulator for maintaining the speed of the motor substantially constant and comprising an electromagnet energized in accordance with the load on said generator and a loose connection between said electromagnet and the regulator proper for operating the regulator in accordance with the generator load, under certain operating conditions.

10. In a regulator system, a motor, a regulator, comprising an electromagnet operated in accordance with the motor speed and a second electromagnet operated in accordance with the load on the motor for maintaining the speed of the motor substantially constant and a loose connection interposed between said second electromaget and the remaining parts of the regulator for operating the regulator in accordance with the motor load only in case of sudden change in load.

11. In a regulator system for a motor, a regulator for controlling the motor and comprising an electromagnet operated in accordance with the motor speed, a second electromagnet operated in accordance with the load on the motor and a loose connection between the second electromagnet and the regulator proper for permitting said second electromagnet to control the regulator only in case of sudden changes in load on the motor.

12. In a regulator system, a motor and a regulator for governing the operation of the motor, said regulator comprising an electromagnet energized in accordance with the motor load and a loose connection associated with the electromagnet for preventing the electromagnet influencing the regulator except in case of sudden changes of the motor load.

13. In a regulator system, a motor and a regulator for governing the operation of the motor, said regulator comprising an electromagnet energized in accordance with certain motor conditions and means for preventing said electromagnet influencing the regulator except in case of sudden changes in motor conditions.

14. In a regulator system, a water wheel, a penstock connected to said wheel, means for operating the wheel at a substantially constant speed, and means for temporarily controlling the wheel in accordance with certain variations in the fluid pressure in said penstock.

15. In a regulator system, a water wheel, a penstock connected to said wheel, a valve in said penstock for controlling the water supplied to the wheel, means for automatically controlling said valve in accordance with the speed of the wheel, means for preventing hunting action, and means for temporarily controlling said valve upon the occurrence of variations in the fluid pressure in the penstock.

16. In a regulator system, a water wheel, a penstock connected to said water wheel, a valve in the penstock for controlling the water supplied to the wheel, means for operating said valve to maintain the speed of the wheel substantially constant, means for controlling said valve to prevent an abnormally low fluid pressure in the penstock, and means for operating said valve to compensate for sudden changes in pressure in the penstock.

17. In a regulator system, a water wheel, a penstock connected to said water wheel, a valve connected to said penstock for controlling the water supplied to the wheel, means for operating said valve in accordance with the speed of, and the load on, said wheel, means for preventing hunting action, and means for temporarily controlling said valve upon the occurrence of variations in the fluid pressure in the penstock.

18. In a regulator system, a water wheel, a penstock connected to said wheel, a valve in said penstock for controlling the water supplied to the wheel, means for effecting a closing of said valve in case of an abnormally low fluid pressure in said penstock, and auxiliary means for regulating the valve in accordance with the fluid presure in the penstock.

19. In a regulator system, a water wheel, a penstock connected to said wheel, a valve in said penstock for controlling the water supplied to the wheel, and means for temporarily controlling said valve upon the occurrence of variations in the fluid pressure in the penstock.

20. In a regulator system, a water wheel, a penstock connected to said wheel, a valve in said penstock for controlling the water supplied to the wheel, and means associated with said valve for operating it in case of sudden change of fluid pressure in the penstock and proportional thereto to compensate for such change in pressure.

21. In a regulator system, a water wheel, a penstock connected to said wheel, a valve connected to said penstock for controlling the amount of water supplied to said water wheel, a pilot valve for governing the operation of the first-mentioned valve, means for operating said pilot valve in accordance with the speed of the wheel, and means for limiting the action of the pilot valve in accordance with the fluid pressure in the penstock.

22. In a regulator system, a water wheel, a penstock connected to said wheel, a valve connected to said penstock for controlling the amount of water supplied to the wheel, means for controlling said valve in accordance with wheel-operating conditions, and means responsive to sudden changes in load on said water wheel and also adapted to temporarily limit the action of the valve in accordance with the fluid pressure in the penstock.

23. In a regulator system, a prime mover, a generator operated thereby, means for controlling said prime mover in accordance with the speed thereof, means for temporarily controlling said prime mover in accordance with the conditions of the load supplied by said generator, and means for temporarily controlling said prime mover in accordance with pressure thereupon, said prime mover being adapted to be controlled in accordance with one or more of said means.

24. In a regulator system, a water wheel, a generator operated thereby, means for controlling said wheel in accordance with the speed thereof, means for controlling said wheel in accordance with the conditions of the load supplied thereby, means for controlling said wheel in accordance with the water pressure thereupon, and means adapted to compensate for sudden changes in water pressure, said wheel being adapted to be controlled in accordance with one or more of said means.

25. In a regulator system, a prime mover having a fluid pressure system co-operating therewith, means for controlling said prime mover in accordance with the speed thereof, means for controlling said prime mover in accordance with sudden changes in the condition of the load supplied thereby, means for controlling said prime mover in accordance with pressure thereupon, and means adapted to compensate for sudden changes in pressure, said prime mover being adapted to be controlled in accordance with one or more of said means.

26. In a regulator system, a water wheel, a generator operated thereby, means for controlling said wheel in accordance with the speed thereof, means for controlling said wheel in accordance with the conditions of the load supplied by said generator, means for controlling said wheel in accordance with the water pressure thereupon, said wheel being adapted to be controlled in accordance with one or more of said means, and electroresponsive means for preventing hunting action.

27. In a regulator system, a prime mover having a fluid pressure system cooperating therewith, means for controlling said prime mover in accordance with the speed thereof, means for controlling said prime mover in accordance with the conditions of the load supplied thereby, means for controlling said prime mover in accordance with pressure thereupon, means adapted to compensate for sudden changes in pressure upon said prime mover, said prime mover being adapted to be controlled in accordance with one or more of said means, and additional means for preventing hunting action.

28. In a regulator system, a prime mover having a fluid pressure system cooperating therewith, means for controlling said prime mover in accordance with the speed thereof, means for controlling said prime mover in accordance with sudden changes in the condition of the load supplied thereby, means for controlling said prime mover in accordance with pressure thereupon, means adapted to compensate for sudden changes in pressure, said prime mover being adapted to be controlled in accordance with one or more of said means, and additional means for preventing hunting action by said regulator.

29. In a regulator system, a prime mover, means for controlling said prime mover in accordance with the speed thereof, means for temporarily controlling said prime mover in accordance with the conditions of the load supplied thereby, means for temporarily controlling said prime mover in accordance with pressure thereupon, and additional means for preventing hunting action by said regulator.

30. In a regulator system, a prime mover, means for controlling said prime mover in accordance with the speed thereof, means for temporarily controlling said prime mover in accordance with the conditions of the load supplied thereby, and additional means for preventing hunting-action in said system.

31. In a regulator system, a prime mover, means for controlling said prime mover in accordance with the speed thereof, means for temporarily controlling said prime mover in accordance with pressure thereupon, and additional means for preventing hunting action in said system.

32. In a regulator system, the combination with a motor and a generator operated thereby, of a regulator for said motor and generator comprising means for actuating said regulator upon variations in motor speed, additional means for selectively actuating said regulator proportional to variations in generator conditions and anti-hunting means associated therewith.

In testimony whereof, I have hereunto subscribed my name this 23rd day of June 1919.

STEPHEN A. STAEGE.